United States Patent
Massetti

(10) Patent No.: US 10,730,263 B2
(45) Date of Patent: Aug. 4, 2020

(54) METHOD FOR MULTI-COLOR VEHICLE INTERIOR COMPONENTS AND COMPONENTS FORMED FROM THE METHOD

(71) Applicant: Joseph A. Massetti, Algonac, MI (US)

(72) Inventor: Joseph A. Massetti, Algonac, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 529 days.

(21) Appl. No.: 13/630,368

(22) Filed: Sep. 28, 2012

(65) Prior Publication Data

US 2013/0078435 A1 Mar. 28, 2013

Related U.S. Application Data

(60) Provisional application No. 61/540,269, filed on Sep. 28, 2011, provisional application No. 61/540,846, filed on Sep. 29, 2011.

(51) Int. Cl.
| | |
|---|---|
| *B32B 3/24* | (2006.01) |
| *B32B 3/26* | (2006.01) |
| *B32B 7/02* | (2019.01) |
| *B32B 27/32* | (2006.01) |
| *B32B 27/08* | (2006.01) |

(Continued)

(52) U.S. Cl.
CPC ............ *B32B 3/266* (2013.01); *B29C 48/10* (2019.02); *B32B 7/02* (2013.01); *B32B 27/08* (2013.01); *B32B 27/32* (2013.01); *B32B 2307/402* (2013.01); *B32B 2590/00* (2013.01); *B32B 2605/003* (2013.01); *B60R 13/02* (2013.01); *Y10T 156/1062* (2015.01); *Y10T 428/24802* (2015.01)

(58) Field of Classification Search
CPC .................. Y10T 428/24339; B32B 3/266
USPC .......................................... 428/138
See application file for complete search history.

(56) References Cited

U.S. PATENT DOCUMENTS

| | | | | |
|---|---|---|---|---|
| 4,670,075 A | * | 6/1987 | Heckel | B29D 99/0057 156/222 |
| 5,641,221 A | * | 6/1997 | Schindele | B60R 13/02 315/84 |
| 5,641,547 A | * | 6/1997 | Dilley | 428/31 |

(Continued)

FOREIGN PATENT DOCUMENTS

| | | |
|---|---|---|
| RU | 2194311 C2 | 12/2002 |
| RU | 2244078 C2 | 1/2005 |

(Continued)

OTHER PUBLICATIONS

International Search Report for International Application No. PCT/US2012/057902; dated Jan. 24, 2013.

(Continued)

*Primary Examiner* — William P Watkins, III
(74) *Attorney, Agent, or Firm* — Cantor Colburn LLP

(57) ABSTRACT

A trim component is provided herein, the trim component having: a first extruded TPO layer having a first show surface and a second backing surface; a second extruded TPO layer applied to the second backing surface of the first extruded TPO layer after the first extruded TPO layer is formed by an extrusion process, wherein a portion of the second extruded TPO layer is visible at the first show surface through a pattern cut in the first extruded TPO layer.

17 Claims, 2 Drawing Sheets

(51) Int. Cl.
*B29C 48/10* (2019.01)
*B60R 13/02* (2006.01)

(56) References Cited

U.S. PATENT DOCUMENTS

| | | | | |
|---|---|---|---|---|
| 6,180,207 | B1* | 1/2001 | Preisler | B29C 43/203 280/728.3 |
| 6,564,397 | B1* | 5/2003 | Hawley | A47K 3/002 4/580 |
| 6,849,320 | B2* | 2/2005 | Duffney | 428/139 |
| 2006/0226638 | A1* | 10/2006 | Yasuda | B60R 21/2165 280/728.3 |
| 2007/0254130 | A1* | 11/2007 | Cheek | B32B 5/22 428/95 |
| 2009/0175047 | A1* | 7/2009 | Tsai | 362/487 |
| 2012/0237725 | A1* | 9/2012 | Stossel | B60R 13/02 428/139 |

FOREIGN PATENT DOCUMENTS

| | | | |
|---|---|---|---|
| RU | 2344935 C1 | 1/2009 | |
| RU | 2009100924 A | 7/2010 | |
| RU | 2171820 C2 | 8/2011 | |
| WO | WO 2011029207 A1 * | 3/2011 | B60R 13/02 |

OTHER PUBLICATIONS

Written Opinion for International Application No. PCT/US2012/057902; dated Jan. 24, 2013.
English Abstract for RU2009100924.
English Abstract for RU2171820.
English Abstract for RU2194311.
English Abstract for RU2244078.
English Abstract for RU2344935.
International Preliminary Report for International Application No. PCT/US2012/057902; dated Apr. 1, 2014.

* cited by examiner

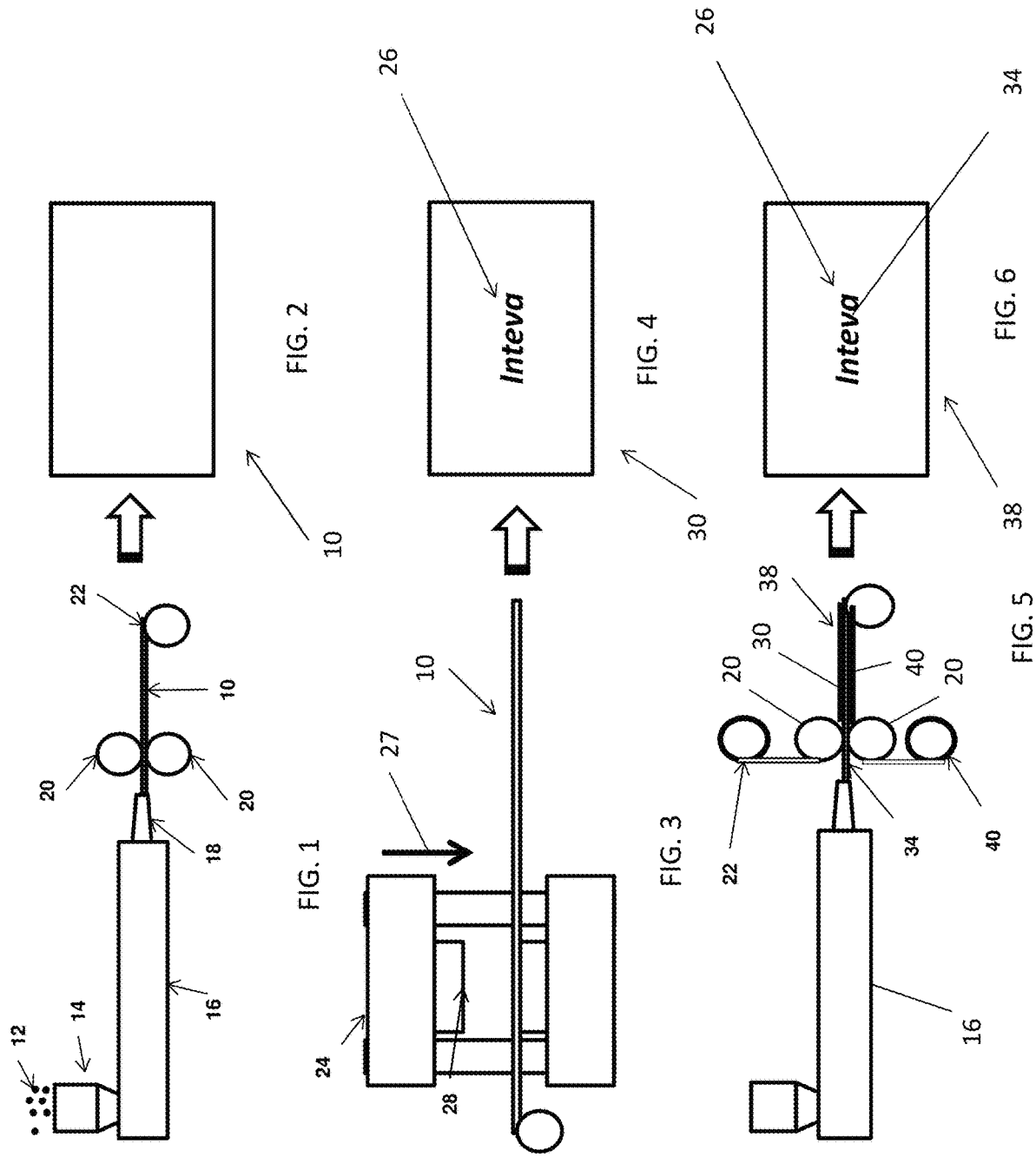

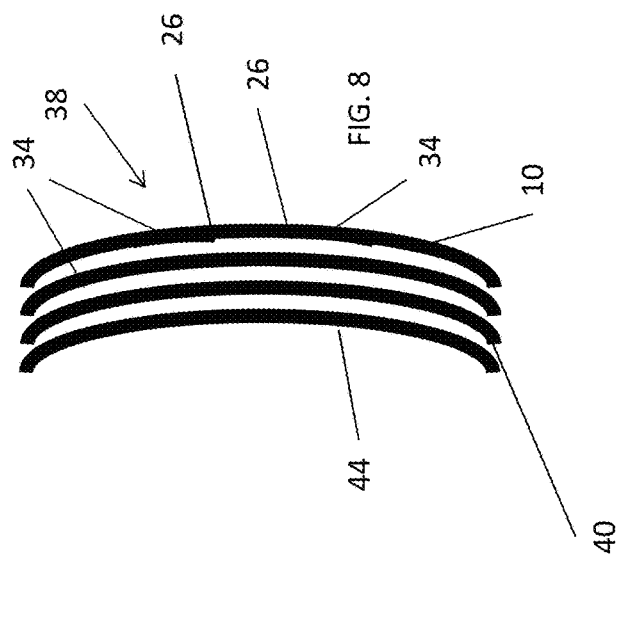
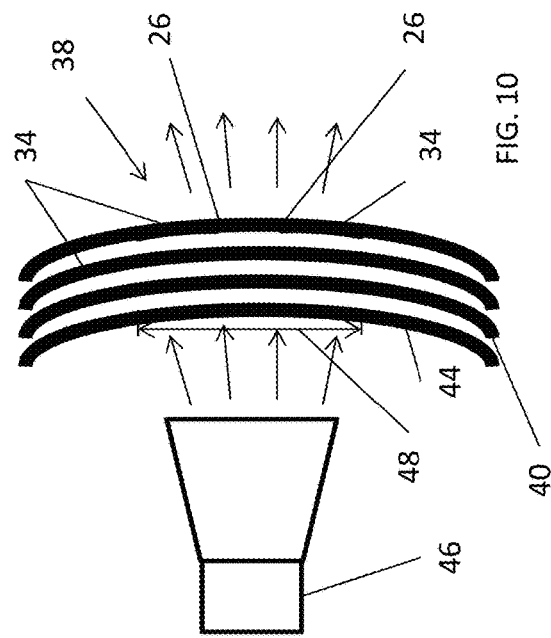
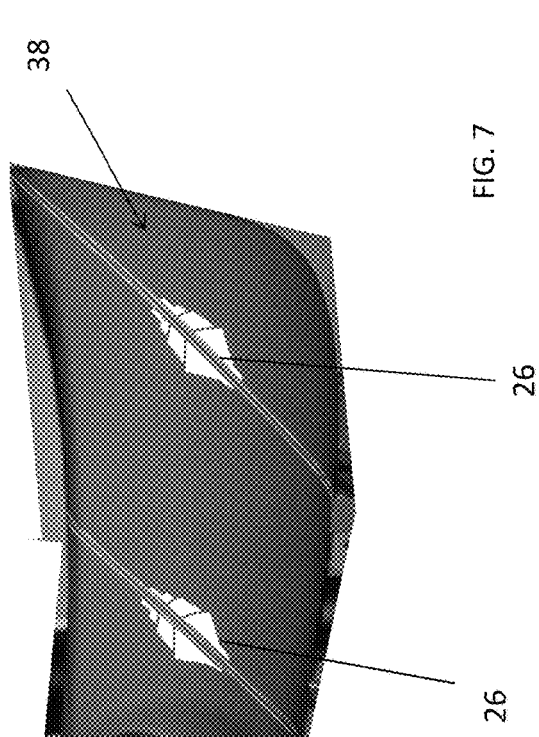
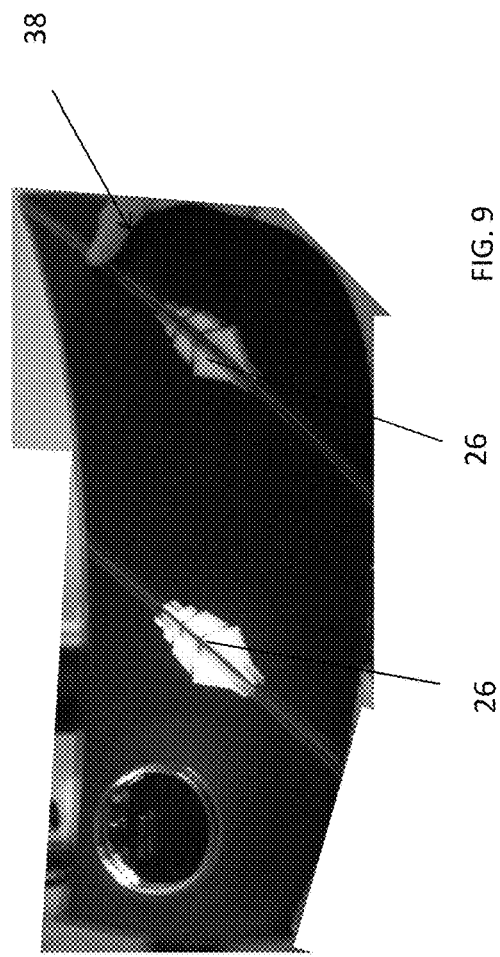

METHOD FOR MULTI-COLOR VEHICLE INTERIOR COMPONENTS AND COMPONENTS FORMED FROM THE METHOD

CROSS REFERENCE TO RELATED APPLICATIONS

This application claims the benefit of U.S. Provisional Patent Applications 61/540,269 filed Sep. 28, 2011 and 61/540,846 filed Sep. 29, 2011, the contents each of which are incorporated herein by reference thereto.

BACKGROUND

This invention relates to an interior structure for a vehicle interior. More particularly, the invention relates to an interior trim component.

Currently, an interior show surface of a vehicle component is formed from a material (e.g., leather, vinyl, thermoplastic olefin (TPO), cloth, etc.) that is cut or formed in a pattern and secured to a component such as a seat cushion, head rest, arm rest, console lid, instrument panel substrate, etc.

Recently, automotive manufactures have shown an interest in applying more detail to interior vehicle surfaces over a wider range of price classes. To make a decorative interior trim piece, there are several process options. One of them being cut, sew, and wrap. This process involves cutting material by hand, sewing pieces together, and wrapping the part. This can be cumbersome and involves a significant amount of manual labor. Insert molding a decorative piece of material onto a part involves a few different process steps. In order to bond material to a part, adhesive is required. Bonding "unlike" materials can be problematic. Painting a decorative design on a part involves an extra step and also has potential issues in bonding to the material Accordingly, it is desirable to provide an improved interior component surface and method of making the same with additional decorative features.

SUMMARY OF THE INVENTION

In one embodiment, a trim component is provided herein, the trim component having: a first extruded TPO layer having a first show surface and a second backing surface; a second extruded TPO layer applied to the second backing surface of the first extruded TPO layer after the first extruded TPO layer is formed by an extrusion process, wherein a portion of the second extruded TPO layer is visible at the first show surface through a pattern cut in the first extruded TPO layer.

In another embodiment, a method for forming a trim component is provided, the method including the steps of: extruding a first extruded TPO layer having a first show surface and a second backing surface; cutting a pattern in the first TPO layer; extruding a second TPO layer; applying the second TPO layer the second backing surface of the first TPO layer, wherein a portion of the second extruded TPO layer is visible at the first show surface through the pattern cut in the first extruded TPO layer.

BRIEF DESCRIPTION OF THE DRAWINGS

Other features, advantages and details appear, by way of example only, in the following description of embodiments, the description referring to the drawings in which:

FIG. 1 illustrates apparatus and method for forming an extruded TPO sheet in accordance with an exemplary embodiment of the present invention;

FIG. 2 is a top view of the extruded TPO sheet formed in FIG. 1;

FIG. 3 illustrates apparatus and method for cutting a pattern into the extruded TPO sheet;

FIG. 4 is a top view of the TPO sheet formed in FIG. 3 containing a cutout pattern;

FIG. 5 illustrates apparatus and method for forming and adding a second extruded TPO sheet to the first extruded sheet in accordance with an exemplary embodiment of the present invention;

FIG. 6 is a top view of the multi-layer TPO sheet formed in FIG. 5;

FIG. 7 illustrates a multi-color trim component formed in accordance with an exemplary embodiment of the present invention;

FIG. 8 is an exploded cross-sectional view of the component illustrated in FIG. 7;

FIG. 9 illustrates an illuminated multi-color trim component formed in accordance with an exemplary embodiment of the present invention; and FIG. 10 is an exploded cross-sectional view of the component illustrated in FIG. 9.

DETAILED DESCRIPTION

In one embodiment, the invention described herein relates to an apparatus and method for producing an extruded thermoplastic olefin (TPO) sheet with a multicolor pattern design and grain implemented on-line onto one sheet. Furthermore, exemplary embodiments are directed to multicolor extruded TPO sheets. Various embodiments of the present invention can be used on decorative trim parts for example, automotive interior inserts, boating trim, etc.

Referring now to the FIGS. and in particular FIGS. 1 and 2, a first step involves extruding a first thin sheet 10 of TPO at a desired color with a desired grain is provided. During this first step, a plurality of pellets 12 are loaded into a hopper 14 and plasticated in an extruder 16 in accordance with known technologies. The molten polymer then exits an extrusion die 18 and passes through a series of rollers 20 which spread the polymer to a desired thickness as well as impart a grain on the top surface, as desired. The resulting extruded sheet 10 is then cooled and coiled into a roll 22 for further processing. Extruded sheet 10 will have a first show surface and a second backing surface.

In a next step a die press 24 is used to cut or blank a pattern 26 (shown as "Inteva") into the first extruded sheet 10 produced in first step to produce a pattern sheet 30 (e.g., extruded sheet 10 with pattern 26). In one embodiment, the pattern 26 is formed using, a steel rule die, a gerber cutter, a clicker die, or laser etc. The pattern being visually perceivable on the first show surface. As shown, the extruded sheet 10 is fed from the roll 22 through the die press 24 wherein a steel rule die 28 blanks the pattern 26 into the sheet upon press closure at periodic intervals by moving downwardly in the direction of arrow 27 and back as the sheet roll 22 is being fed through the press 24. Of course, alternative methods for forming the pattern are considered to be within exemplary embodiments of the present invention.

In a third or final step, the pattern sheet 30 is then fed into an extrusion line and added as a top sheet 32 to another material or a back layer 34 being currently extruded in a similar fashion to the first sheet to form a produced TPO sheet 38. In accordance with one non-limiting exemplary embodiment, the extruded back layer 34 is typically a different color than the first extruded sheet 10 and is applied to the second backing surface of the first extruded sheet 10. In addition, the extruded back layer 34 can have a different grain or one similar to that of the first extruded sheet 10, which is formed by grain rollers 20. In addition, the produced TPO sheet 38 can be at any desired thickness with or without a foam backing 40, which is shown as being applied during the third or final step when the second layer of material 34 is being extruded. It is contemplated that the foam backing 40 provides a cushioning support material and may be of any number of different constructions such as cross linked polypropylene (XLPP) or any other material capable of being applied via a roll or in a sheet or any other process. Furthermore, and in order to vary the thickness of the produced TPO sheet the thickness of the backing layer 34 can also be varied.

FIG. 6 illustrates the back layer 34 being extruded and fed into grain rollers 20 while the top layer roll material 30 from steps 1 and 2 illustrated in FIGS. 1 and 2 is fed between the rollers concurrently from the top. Also, the foam layer 40 is fed concurrently between the grain roller 20 from bottom. Thereafter, all three layers laminated together upon exiting the grain rollers 20 and the back layer material 34 presents itself or is visually perceived at cutout areas of top layer 20 that form the pattern 26. Still further the backing layer 34 can be received into the pattern 26 such that it is flush with the show surface. Alternatively, the backing layer can be positioned behind the openings of pattern 26 or any combinations of the aforementioned processes are contemplated.

The finished product results in a TPO sheet that is capable of being multicolored as well as multi-grained (e.g., a different grain on the first extruded sheet 10 versus extruded sheet 34) along with a designed pattern 26 implemented onto the sheet 10. Accordingly, an all-in-one sheet design is provided wherein extra processing steps are eliminated. These extra processes that are eliminated include, but are not limited to, insert molding, adhesive bonding, cut/sew/wrap, etc.

In another alternative embodiment, it is possible that the backside layer 34 can be extruded in multiple colors, depending on the product requirements. For example, multiple backside layer colors can be accomplished by adding independent extruders and corresponding extrusion dies for each of the colors to be fed in parallel to the roll stack entrance and proximate to the desired location with respect to the pattern 26.

Alternatively, the backside layer 34 can be extruded in multiple colors using one split die receiving the melt from multiple independent extruders.

FIGS. 7 and 8 illustrate one non-limiting example of a produced TPO sheet 38 wherein the patterns 26 are clearly visible due to the incorporation of the second extruded back layer 34. In addition, the produced TPO sheet 38 can also be configured to have a substrate layer 44, which can be separately formed from a plastic injection molding process or any other equivalent method. Substrate layer 44 can be constructed out of any dimensionally stable plastic or other suitable material located below the foam backing layer 40.

Referring now to FIGS. 9 and 10, it is also possible to illuminate the patterned feature 26 of the produced TPO sheet 38. As shown in FIG. 10 a source of illumination 46 (e.g., light bulb, LED or other source of light) can be placed behind the pattern to provide an illumination effect. The light source can be directed through the topsheet, backlayer, foam layer, and substrate as shown in FIG. 10 or a cutout 48 can be produced in the substrate to allow light to pass only through the top extruded sheet 10, the back layer 34 foam layer 40 to provide greater illumination. If necessary, foam layer 40 may also be cutout to allow the source of illumination 46 to directly illuminate back layer 34. Still further and in addition to or in conjunction with the aforementioned configuration, the substrate 44 and the foam layer 40 as well as back layer 34 (if necessary) can be formed from a translucent material to provide the required effect when illuminated so that pattern 26 is illuminated.

Various embodiments of the present invention eliminate extra steps by placing the decorative design directly into the material before the part is made or formed. Still further, the processes disclosed herein allows the TPO skin to be recycled easily due to the fact that the material is all the same. There is no combination of various materials involved. This is in contrast to other process options, wherein the ability to reuse or recycle the material is difficult and not cost effective.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A trim component, consisting of:
   a first extruded TPO layer having a first show surface and a second backing surface, the first extruded TPO layer being formed by a first extrusion step;
   a second extruded TPO layer consisting essentially of TPO and an optional colorant and applied to the second backing surface of the first extruded TPO layer via a second extrusion step, wherein the second extruded TPO layer is applied to the second backing surface after the first extruded TPO layer is formed by the first extrusion step, and wherein a portion of the second extruded TPO layer is visible at the first show surface through a pattern cut in the first extruded TPO layer and is flush with or behind the first show surface of the first extruded TPO layer, and further wherein the trim component is part of an interior component of a vehicle and is at least one of a seat cushion, a head rest, an arm rest, a console lid, and an instrument panel.

2. The trim component as in claim 1, wherein the pattern is cut in the first extruded layer after the first extruded layer is formed by the first extrusion step and prior to the application of the second extruded TPO layer.

3. The trim component as in claim 1, wherein the first show surface of the first extruded TPO layer has a first grain associated therewith and the portion of the second extruded TPO layer has a second grain associated therewith, the first grain being different than the second grain.

4. The trim component as in claim 1, wherein the first extruded TPO layer has a first color and the second extruded TPO layer has a second color, the first color being different than the second color.

5. The trim component as in claim 1, wherein the first show surface of the first extruded TPO layer has a first grain associated therewith and the portion of the second extruded TPO layer has a second grain associated therewith, the first grain being different than the second grain and wherein the first extruded TPO layer has a first color and the second extruded TPO layer has a second color, the first color being different than the second color.

6. The trim component as in claim 1, wherein a source of illumination is located behind the second extruded TPO layer.

7. The trim component as in claim 6, wherein the first show surface of the first extruded TPO layer has a first grain associated therewith and the portion of the second extruded TPO layer has a second grain associated therewith, the first grain being different than the second grain and wherein the first extruded TPO layer has a first color and the second extruded TPO layer has a second color, the first color being different than the second color.

8. The trim component as in claim 1, wherein the trim component is part of an instrument panel of the vehicle.

9. The trim component as in claim 8, wherein the first show surface of the first extruded TPO layer has a first grain associated therewith and the portion of the second extruded TPO layer has a second grain associated therewith, the first grain being different than the second grain and wherein the first extruded TPO layer has a first color and the second extruded TPO layer has a second color, the first color being different than the second color.

10. The trim component as in claim 8, wherein a source of illumination is located behind the second extruded TPO layer.

11. The trim component as in claim 10, wherein the first show surface of the first extruded TPO layer has a first grain associated therewith and the portion of the second extruded TPO layer has a second grain associated therewith, the first grain being different than the second grain and wherein the first extruded TPO layer has a first color and the second extruded TPO layer has a second color, the first color being different than the second color.

12. A trim component, consisting of:
a first extruded TPO layer having a first show surface and a second backing surface;
a second extruded TPO layer consisting essentially of TPO and an optional colorant and applied to the second backing surface of the first extruded TPO layer after the first extruded TPO layer is formed by an extrusion process, wherein a portion of the second extruded TPO layer is visible at the first show surface through a pattern cut in the first extruded TPO layer and is flush with or behind the first show surface of the first extruded TPO layer, wherein a source of illumination is located behind the second extruded TPO layer and further wherein the trim component is part of an interior component of a vehicle and is at least one of a seat cushion, a head rest, an arm rest, a console lid, and an instrument panel.

13. The trim component as in claim 12, wherein the pattern is cut in the first extruded layer after is formed by the extrusion process and prior to the application of the second extruded TPO layer.

14. The trim component as in claim 12, wherein the first show surface of the first extruded TPO layer has a first grain associated therewith and the portion of the second extruded TPO layer has a second grain associated therewith, the first grain being different than the second grain.

15. The trim component as in claim 12, wherein the first extruded TPO layer has a first color and the second extruded TPO layer has a second color, the first color being different than the second color.

16. The trim component as in claim 12, wherein the first show surface of the first extruded TPO layer has a first grain associated therewith and the portion of the second extruded TPO layer has a second grain associated therewith, the first grain being different than the second grain and wherein the first extruded TPO layer has a first color and the second extruded TPO layer has a second color, the first color being different than the second color.

17. A trim component, consisting of:
a first extruded TPO layer having a first show surface and a second backing surface, the first extruded TPO layer being formed by a first extrusion step;
a second extruded TPO layer consisting essentially of TPO and an optional colorant and applied to the second backing surface of the first extruded TPO layer via a second extrusion step, wherein the second extruded TPO layer is applied to the second backing surface after the first extruded TPO layer is formed by the first extrusion step, and wherein a portion of the second extruded TPO layer is visible at the first show surface through a pattern cut in the first extruded TPO layer and is flush with or behind the first show surface of the first extruded TPO layer; and
a layer of foam backing is applied to the second extruded TPO layer, wherein the trim component is configured to is part of an interior component of a vehicle selected from the group consisting of a seat cushion, a head rest, an arm rest, a console lid, an instrument panel, and an automotive interior insert.

* * * * *